United States Patent [19]

Temple

[11] Patent Number: 5,143,381
[45] Date of Patent: Sep. 1, 1992

[54] PIPE JOINT SEAL

[75] Inventor: Lowell D. Temple, Fort Wayne, Ind.

[73] Assignee: Pipe Gasket & Supply Co., Inc., Fort Wayne, Ind.

[21] Appl. No.: 694,211

[22] Filed: May 1, 1991

[51] Int. Cl.⁵ .............................................. F16J 15/10
[52] U.S. Cl. .................................. 277/1; 277/207 A; 285/94; 285/910
[58] Field of Search ................. 277/207 A, 1; 285/94, 285/104, 105, 335, 338, 344, 350, 910

[56] References Cited

U.S. PATENT DOCUMENTS

| | | | |
|---|---|---|---|
| 2,271,777 | 4/1939 | Nathan | 277/207 A X |
| 3,498,623 | 3/1970 | Rowe | 277/207 A X |
| 3,647,229 | 3/1972 | Grimes | 277/207 A |
| 4,209,179 | 6/1980 | Tolliver | 277/207 A X |
| 4,365,818 | 12/1982 | Tolliver | 277/207 A X |
| 4,410,185 | 10/1983 | Sporre | 277/207 A X |
| 4,641,858 | 2/1987 | Roux | 285/94 |
| 4,850,603 | 7/1989 | Haaland | 277/207 A |
| 4,934,716 | 6/1990 | Nordin et al. | 277/207 A |
| 4,946,175 | 8/1990 | Nordin et al. | 277/207 A |

FOREIGN PATENT DOCUMENTS 682728  3/1964  Canada ................... 277/207 A

Primary Examiner—William A. Cuchlinski, Jr.
Assistant Examiner—Scott W. Cummings
Attorney, Agent, or Firm—Roger M. Rickert

[57] ABSTRACT

An improved sliding pipe joint seal for use in sealing an annular space created between a sealing surface of a spigot at an end of a length of pipe and a sealing surface of a bell shaped end of another length of pipe when the two pipes are connected end-to-end. The pipe joint seal includes an annular body having an inner gripping surface and an outer tab. The gripping surface is adapted to engage the sealing surface of the spigot to retain the seal thereon. The body has a normally closed annular chamber storing a lubricant, such as a grease. An annular slit in the body extends into the chamber forming a flap intermediate the slit and tab. The slit is spread apart when the bell shaped end engages the seal as the pipes are joined, thereby releasing the grease against the sealing surface of the bell shaped end as the seal slides over the remainder of the sealing surface of the bell shaped end.

5 Claims, 1 Drawing Sheet

PIPE JOINT SEAL

TECHNICAL FIELD

The invention relates in general to sealing devices and in particular to an improved sliding type pipe joint seal for use in connecting two lengths of piping end-to-end.

BACKGROUND ART

Pipe used for underground work is typically provided with a flared bell at one end and a spigot at the opposite end. The flared bell end is formed with a predetermined inner diameter, which defines a first sliding surface. The spigot end is formed with a predetermined outer diameter, which defines a second sliding surface. The inner diameter of the flared bell end is greater than the outer diameter of the spigot end. This allows lengths of pipe to be joined end-to-end by inserting the spigot end of one pipe into the flared bell end of another pipe. However, since the inner diameter of the flared bell is greater than the outer diameter of the spigot, an annular space is created therebetween. The annular space must be sealed by a suitable means in order to prevent fluid leakage where the pipes are connected together.

Two known means for sealing such annular spaces include the use of a rolling type ring seal or a sliding type ring seal. In a conventional sliding type ring seal, the seal is first placed on the sealing surface of the spigot at one end of a pipe. The spigot is inserted into the flared bell end of another pipe. As the spigot is inserted, a surface of the seal engages and slides back against the sealing surface of the flared bell end. This distorts the original shape of the ring seal resulting in the annular space between the two sealing surfaces being closed. However, as the sealing surface of the flared bell end engages and distorts the seal, frictional forces are generated. In order to reduce these frictional forces at the point in which the sliding takes place, it is desirable to apply a lubricant to the ring seal.

An example of sliding type ring seal having a lubricant applied to the seal is illustrated in U.S. Pat. No. 4,934,716. An annular seal is positioned on a shoulder of a spigot at one end of a length of pipe. The seal is comprised of two portions, namely, a main body and a flexible lip. The lip is connected with the main body at the base thereof, and extends up the entire height of the main body. The main body and the lip are provided with opposed surfaces which constitute the sliding surfaces of the seal. A pocket is formed by the opposed surfaces. A lubricant is located in the pocket to facilitate sliding between the surfaces of the seal when the spigot is inserted into a bell end of another pipe.

DISCLOSURE OF THE INVENTION

The invention is directed to an improved sliding type pipe joint seal for sealing an annular space created between an exterior sealing surface of a spigot at an end of a length of pipe and an interior sealing surface of a bell shaped end of another length of pipe, when the two pipes are connected end-to-end. The pipe joint seal includes an annular body having an inner gripping surface and an annular tab. The tab has a diameter greater than the diameter of the interior sealing surface on the bell. The gripping surface is adapted to engage the sealing surface of the spigot to retain the seal thereon. The body has a normally closed internal annular chamber containing a lubricant, such as grease. An annular slit is provided in the body to extend into the chamber. When the bell end of one pipe is moved over the spigot end of another pipe, the slit is spread apart when the bell end engages the tab on the seal, thereby releasing the grease against the sealing surface of the bell end. The grease lubricates the remainder of the sealing surface on the bell end as the pipes are moved together.

Accordingly, it is an object of the invention to provide an improved self lubricating sliding seal for connecting pipes end-to-end.

Other objects and advantages of the invention will be apparent from the following detailed description and the accompanying drawings.

BEST MODE FOR CARRYING OUT THE INVENTION

Figure 1:
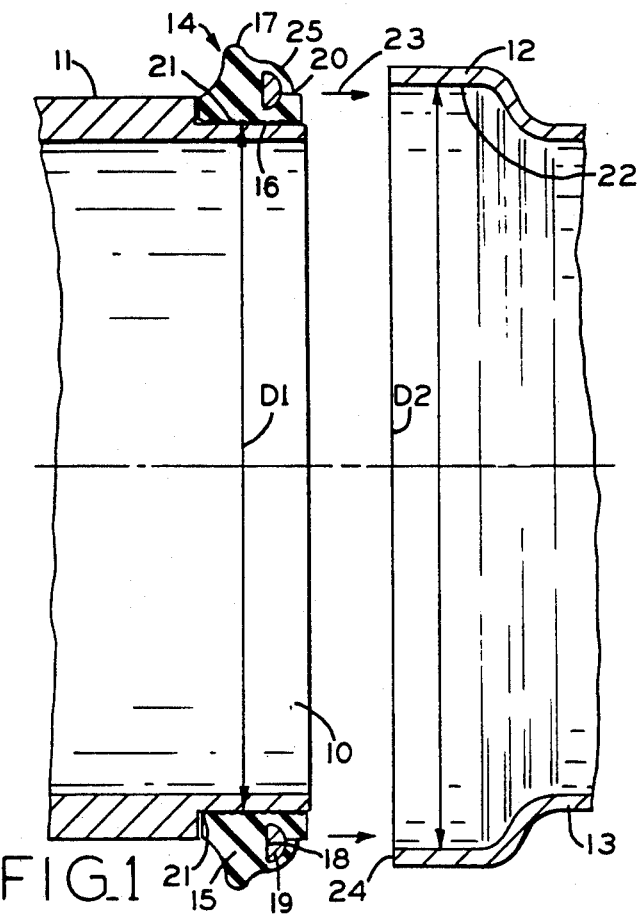
FIG. 1 is a fragmentary cross sectional elevational view of a sliding type pipe joint seal secured to a spigot at an end of a pipe, constructed in accordance with this invention.

Referring to the drawings, FIG. 1 illustrates a spigot 10 at the end of a length of pipe 11 and a bell shaped end 12 of a second length of pipe 13, which are to be joined by a sliding pipe joint seal 14. The spigot 10 has an outer diameter D1, which defines a first circumferential sealing surface 21. The bell end 12 has an inner diameter D2 which is greater than the diameter D1 of the spigot 10. The inner diameter D2 of the bell end 12 defines a second circumferential sealing surface 22. The seal 14 is preferably constructed from an elastomeric material, such as a vulcanized rubber, and is positioned on the sealing surface 21 of the spigot 10. The seal 14 is preferably made from a material which will not be subject to attack by materials carried through the joined pipes 11 and 13.

The seal 14 includes a main body 15 having an inner annular surface 16 for gripping the spigot 10, and an outer annular tab 17. The inner surface 16 is preferably formed with a plurality of serrations for improving the retention of the seal 14 on the spigot and for improving the fluid seal between the seal 14 and the spigot surface 21. The tab 17 extends radially from and around the seal 14 and has a diameter greater than the diameter D2 of the sealing surface 22 on the bell end 12. An enclosed annular chamber 18 is formed in the seal body 15. A lubricant 19, such as a grease, is provided in the chamber 18. An annular slit 20 is formed in the body 15 around the axis of the seal 14 to extend into the opening 18. As shown in FIG. 1, the slit 20 is normally biased closed through the resiliency of the seal 14.

Figure 2:
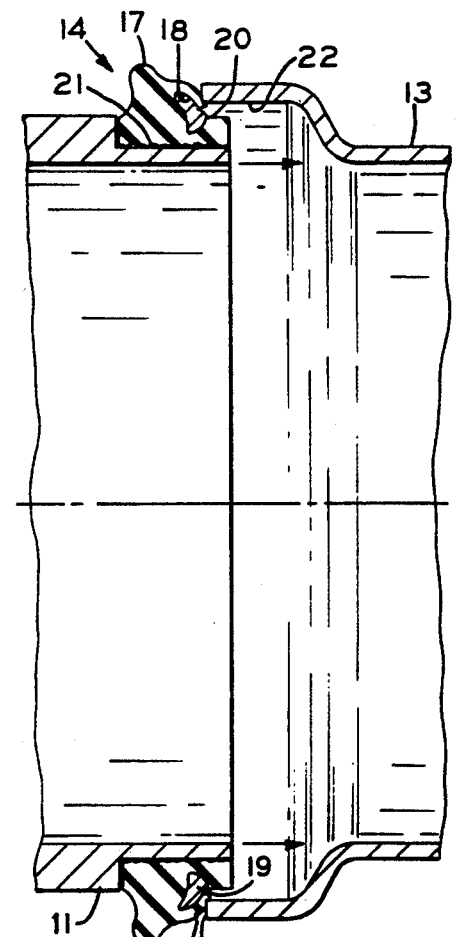
FIG. 2 is a fragmentary cross sectional elevational view showing the pipe joint seal of FIG. 1 in a partially installed position.
Figure 3:
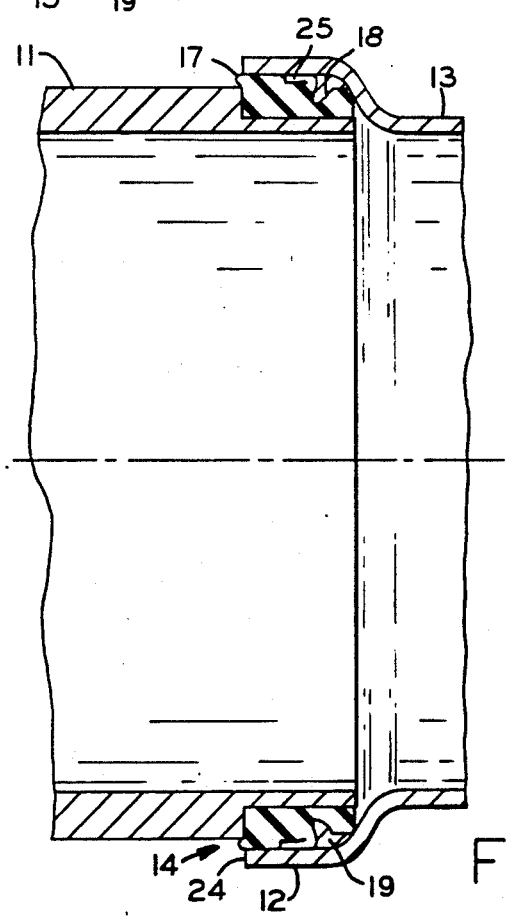
FIG. 3 is a fragmentary cross sectional elevational view showing the pipe joint seal of FIG. 1 in a fully installed position.

In order to join the pipes 11 and 13 together, the seal 14 is first placed on the spigot 10 with the serrated gripping surface 16 engaging the spigot surface 21. The spigot 10 of the pipe 11 then is inserted into the bell end 12 of the pipe 13, in the direction indicated by the arrows 23. Initially, an end 24 of the pipe 13 engages the flap 25 and rolls back the seal 14, as shown in FIG. 2, to open the slit 20, exposing the lubricant 19 contained in the chamber 18. End 24 subsequently engages tab 17 and flap 25 is rolled back to the position shown in FIG. 3. With the slit 20 thus opened, the lubricant flows outwardly toward the bell end sealing surface 22 and an outer surface including flap 25 of the seal 14 adjacent thereto. The coating of lubricant on these surfaces reduces the frictional forces at the point of sliding contact between the seal 14 and the bell surface 22. Finally, the spigot 10 is fully inserted into the bell end 12 and the seal 14 further engages the sealing surface 22 and is distorted from its original shape, shown in FIG. 1, to the shape illustrated in FIG. 3, thereby forming a fluid tight seal between the sealing surfaces 21 and 22. Thus, the seal 14 provides a one-piece sliding type pipe joint seal which carries and releases a lubricant during the end-to-end connection of the pipes.

It will be appreciated that various modifications and change may be made in the seal 14 without departing from the spirit and the scope of the following claims. The material of the seal 14 may be varied, depending on the type of pipes to be joined and the fluids to be carried by the pipes. Further, the cross section of the seal 14 may be varied while still providing a lubricant chamber and an annular tab which opens the chamber to dispense the lubricant as the pipes are joined.

I claim:

1. The method of sealing an annular space created between a sealing surface of a spigot at an end of a length of pipe and an internal sealing surface on a bell shaped end of another length of pipe comprising the steps of providing a sealing member having an annular elastomeric body with an enclosed annular chamber and an annular slit in the body communicating with the chamber, introducing a grease-like lubricant into the chamber, positioning the sealing member intermediate a sealing surface of a spigot at one end of a first length of pipe and an internal sealing surface on a bell shaped end of a second length of pipe, inserting the spigot of the first length of pipe into the bell end of the second length of pipe so that one of said pipes engages the body and opens the slit exposing the grease to the sealing surface of said one pipe.

2. A pipe joint seal for sealing an annular space created between a sealing surface of a spigot at an end of a length of pipe and an integral sealing surface on a bell shaped end of another length of pipe when the two pipes are joined together comprising an annular body, means for retaining said body on said spigot sealing surface, said body having a normal diameter greater than the diameter of said bell end sealing surface, means for storing a lubricant in said body including an annular chamber located in and coaxial with said body, and means for releasing said lubricant from said body when said bell end engages said body and slides thereover distorting said body from its normal shape to form a seal between said sealing surfaces, the means for releasing the lubricant stored in said body including a tab provided on an outer diameter of said body, an annular slit formed in said body and extending to said chamber and a flap intermediate said tab and said slit, and wherein said flap is engaged by an edge on said bell shaped end to open said slit and release said lubricant as said bell end sealing surface slides over said spigot.

3. The pipe joint seal according to claim 2 wherein said means for retaining said body on said spigot sealing surface includes an annular serrated gripping surface on an inner diameter of said annular body.

4. The pipe joint seal according to claim 3 wherein said serrated gripping surface is secured to the spigot sealing surface.

5. A pipe seal for sealing an annular space created between a sealing surface of a spigot at an end of a length of pipe and an internal sealing surface on a bell shaped end of another length of pipe comprising a main body having an inner gripping surface adapted to engage the spigot sealing surface to retain said seal thereon, said body including an annular chamber formed therein, said chamber storing a lubricant, said body having an annular slit connecting with said chamber and a flap forming a portion of the chamber and terminating at the slit, and wherein said bell end engages said seal to engage and roll back the flap and thereby spread said slit apart and dispense said lubricant onto said bell end sealing surface as said bell end is positioned over said spigot and said seal.

* * * * *